(12) United States Patent
Christopherson et al.

(10) Patent No.: US 6,632,521 B2
(45) Date of Patent: Oct. 14, 2003

(54) POLYMERIC FILMS AND PACKAGES PRODUCED THEREFROM

(75) Inventors: Roy Christopherson, Swindon (GB); David Thomas Stell, Bristol (GB)

(73) Assignee: Rexam Medical Packaging Ltd, London (GB)

( * ) Notice: Subject to any disclaimer, the term of this patent is extended or adjusted under 35 U.S.C. 154(b) by 51 days.

(21) Appl. No.: 09/875,936

(22) Filed: Jun. 8, 2001

(65) Prior Publication Data

US 2002/0016116 A1 Feb. 7, 2002

(30) Foreign Application Priority Data

Jun. 29, 2000 (GB) .............................................. 0015822
Mar. 15, 2001 (GB) .............................................. 0106332

(51) Int. Cl.$^7$ .......................... B32B 27/08; B65D 65/40
(52) U.S. Cl. ................ 428/336; 428/475.8; 428/476.1; 428/476.3; 428/476.9; 428/512; 428/513; 428/521; 428/523
(58) Field of Search ................. 428/336, 512, 513, 521, 523, 475.8, 476.1, 476.3, 476.9; 525/240, 241

(56) References Cited

U.S. PATENT DOCUMENTS 5,344,714 A    9/1994  Su ............................. 428/516
5,712,006 A    1/1998  Marano et al. ............. 428/34.2

FOREIGN PATENT DOCUMENTS

| DE | 199 13 419 | 11/1999 |
| EP | 0 189 986 | 8/1986 |
| EP | 0 640 472 | 3/1995 |
| EP | 0 812 874 | 12/1997 |
| EP | 0 869 146 | 10/1998 |
| GB | 2 323 812 | 10/1998 |
| JP | 2000-158610 | 6/2000 |

OTHER PUBLICATIONS

Database WPI, Section Ch, Week 199209. Derwent Publications Ltd., London GB; AN 1992–069810 XP002179559 & JP 04 14444 A (Takigawa Kaguki Kog), Jan. 20, 1992.

Database WPI, Section Ch, Week 200044. Derwent Publications Ltd., London GB; AN 2000–492714 XP002179560 & JP 2000 144074 A (Nitto Denko Corp), May 26, 2000.

*Primary Examiner*—D. S. Nakarani
(74) *Attorney, Agent, or Firm*—Blank Rome LLP

(57) ABSTRACT

Polymeric films having at least one outer layer consisting of a blend of low density polyethylene and a poly(alkylstyrene) can be heat sealed to non-woven webs such as paper to produce peel openable packages, for example for medical equipment. Such packages can be peeled open with low fiber lift from the non-woven webs.

18 Claims, No Drawings

POLYMERIC FILMS AND PACKAGES PRODUCED THEREFROM

BACKGROUND OF THE INVENTION

1. Field of the Invention

This invention concerns polymeric films and packages produced therefrom, and more particularly it concerns polymeric films which are heat sealable to non-woven webs to produce peel openable packages, for example for medical equipment.

2. Description of the Related Art

The use of heat sealable polymeric films is widely used in the packaging art. However, gaining access to articles which have been packaged by heat sealing such films to themselves or to other substrates often presents problems due to the strengths of the seals which are produced. In some instances the problem is comparatively minor, for example where tearing of the film is acceptable. In others, the problem is more major, and various proposals have been made hitherto to overcome this problem, for example by constructing the films in such a way that the heat seals themselves are weak enough that they part if sufficient force is applied, or by designing the films so that they fail within their respective structures when a peeling force is applied, such failure being by delamination of a multi-layered film or by rupture within the thickness of a layer of the film. Peeling by failure of a heat seal or by delamination within a film is usually referred to in the art as adhesive failure whereas rupture within the thickness of a film is usually referred to as cohesive peeling.

Heat seals formed between heat sealable polymeric films and other substrates can present additional problems, and although they can be arranged to peel by adhesive or cohesive peeling mechanisms, heat seals to non-woven materials, for example paper, present special problems in certain packaging applications. More particularly, the peeling of such seals can result in the removal of fibers from the non-woven material, and these can cause contamination for example of packaged medical equipment. This tends to be a particular problem with so-called "direct seals" in which a heat sealable film is heat sealed directly to an uncoated paper, peeling being by peeling the heat seal material from the fibers of the paper.

"Direct seals" between polymeric films and paper are attractive commercially because they can be formed by directly adhering polymeric films to paper. However, if the seals are to have sufficient strength to maintain their integrity during transport of packages made using them, the release of loose fibers during peeling of the seals tends to be a problem. Whilst this problem can be reduced by selecting the materials used to form the heat seal, it is difficult to achieve seals which peel reliably without the release of fibers from the paper. More particularly, too low a heat sealing temperature will result in insufficiently strong seals, whereas too high a heat sealing temperature will result in seals which will be too strong, resulting in tearing of the paper when attempts are made to peel these seals. Furthermore, the temperature and pressure ranges over which heat seals can be obtained with acceptable peelability using conventional heat seal materials tends to be narrow.

BRIEF SUMMARY OF THE INVENTION

According to the present invention there is provided a polymeric film having at least one outer layer comprising a blend of low density polyethylene and a poly-(alkylstyrene).

Films in accordance with the present invention have been heat sealed directly to paper webs over a relatively wide temperature range to produce packages having "direct seals" which can be readily peeled without substantial release of free fibres from the paper, peeling being by failure of the bond between the outer layer of the film and the paper web to which it has been heat sealed. In addition, more consistent peel strengths have been achieved with films of the present invention over a wider temperature range compared with those obtained for analogous films which use the same low density polyethylene alone as the heat seal material. This has also been achieved using relatively short dwell times. Furthermore, films of the present invention have exhibited more consistent peel strengths over a wider temperature range than analogous films which use linear low density polyethylene alone as the heat seal material.

Heat seals formed between films in accordance with the present invention and paper have also shown good peelability when compared with heat seals formed by similar films having heat seal layers consisting of blends of ethylene/vinyl acetate copolymers and poly-($\alpha$-methylstyrene) to paper, where delamination of the paper itself tends to occur, or with blends of linear low density polyethylene combined with the same poly-($\alpha$-methylstyrene), where the heat seal strength to the paper tends to be less than that of comparable heat seals of the same linear low density polyethylene directly to the same paper.

Films in accordance with the present invention can therefore be used to form satisfactory and peelable heat seals over a wider temperature range than has been obtainable with prior art heat seal materials, thereby enabling satisfactory seals to be produced even when the precise temperature obtainable by the equipment which is used is uncertain, for example due to poor maintenance or uneven temperature distribution over the heat sealing surface.

Although the strength of a specific heat seal should be sufficiently strong to prevent failure due to the weight of the contents of a package, strengths of less than 1.0N/15 mm are generally considered to be too weak. However, in order to achieve peelability for heat seals "direct seals" to paper which peel without substantial fiber loss therefrom, it is generally desirable that such seals have peel strengths of not more than 2.0N/15 mm. The peel test for these purposes is preferably effected by first forming the heat seal to be tested and then adhering the paper side of the laminate to the circumference of an approximately 150 mm diameter wheel which is free to rotate about its axis. The force required to pull the film away from the paper is then measured, the pulling being effected substantially radially of the wheel, that is substantially perpendicularly to the paper.

DETAILED DESCRIPTION OF THE INVENTION

The low density polyethylene used in accordance with the present invention will in general have a density of from 0.915 to 0.930 g/cm$^3$. The melt flow index of the low density polyethylene is preferably in the range of 2.0 to 40.0 g/10 min according to ASTM D1238-95. Particularly preferred low density polyethylenes for use in accordance with the present invention have a density of about 0.918 g/cm$^3$ and a melt flow index of about 15 g/10 min according to ASTM D1238-95.

The poly-(alkylstyrenes) are preferably derived from one or more methylstyrenes, the methyl substituent being on the ethylenic moiety or on the phenyl ring thereof. Preferred poly-(alkyl-styrenes) for use in accordance with the present invention include poly-($\alpha$-methylstyrene) and poly-(vinyltoluene).

The amount of poly-(alkylstyrene) in the blend should be at least sufficient to increase the heat seal strength of the low density polyethylene to the paper web to which it is to be heat sealed, and it preferably represents not more than 20% by weight and more preferably not more than 15% by weight of the blend, a preferred range being from 2 to 12% by weight of the blend. The poly-(alkylstyrenes) used in the blends preferably have a mean molecular weight $M_W$ of from 800 to 2000.

Films in accordance with the present invention preferably consist of two or more polymeric layers, at least one of the outer layers being formed from a blend of low density polyethylene and a poly-(alkylstyrene). The nature of the other layers and their respective thicknesses will in general be selected according to the end use to be made of the films of the present invention. However, the films will usually have an outer layer of a blend of low density polyethylene and a poly-(alkylstyrene) which is at least 5 µm thick. Thicker layers of the blend can be used, for example up to 15 µm or more, but provided a peelable heat seal can be formed, no advantage has been observed in using particularly thick layers. A preferred range of thicknesses if from 3 to 12 µm.

The other layers of multi-layered films of the present invention can as indicated above be selected according to the particular end use of the films. However, a preferred group of such films have a base layer of a polyethylene or an ethylene/vinyl acetate copolymer with one or more layers thereon, either directly thereon or with at least one intermediate layer. The polyethylene of the base layer can be medium density polyethylene, low density polyethylene, or linear low density polyethylene, preferred polyethylenes being low density polyethylenes, for example the low density polyethylene present in the blend with the poly-(alkylstyrene) forming the heat seal layer in accordance with the invention.

Although films of the present invention can have both outer surfaces formed from a blend of low density polyethylene and a poly-(alkylstyrene), which can be the same or different, it is generally preferred that only one outer surface of the film be formed from such a blend. The other surface of the film can then be formed from a variety of other polymeric materials, a preferred group of such polymers including polymers which provide water vapor barrier properties, for example nylon. If such outer layers form inherently weak bonds to the layers to which they are applied, it is preferred to include at least one intermediate tie layer which facilitates bonding between these layers, for example a maleic anhydride modified polyethylene to bond an outer nylon layer to a polyolefin intermediate or base layer.

A particularly preferred structure for films of the present invention consists of a base layer of low density polyethylene having a blend of a low density polyethylene and a poly-(alkylstyrene) directly on one surface thereof and another surface layer of nylon, preferably nylon 6, on the other surface of the base layer, the nylon layer being adhered to the base layer by a layer of a maleic anhydride modified linear low density polyethylene.

Other film structures in accordance with the present invention include the specified blends forming one outer surface on a polyethylene base web with the other outer surface consisting of a layer of nylon, in general with a suitable tie layer between the polyethylene and nylon layers, or with the base web consisting of a polyester, nylon, a polycarbonate or polypropylene.

The various layers of films in accordance with the present invention can include one or more additives known in the polymeric film art, for example slip, antistatic and antiblocking agents.

Films in accordance with the present invention can be produced by known methods, a preferred method being to coextrude melts of the respective layers through a slot die, followed by winding up the film after cooling the coextrudate to solidify the respective layers.

The present invention further provides heat sealed packages comprising a film of the present invention heat sealed to a web of a non-woven material.

The non-woven web can be formed from natural, for example cellulose, or synthetic, for example polyalkene, e.g. polyethylene or polypropylene, fibers. Paper is a particularly preferred non-woven material for forming packages in accordance with the present invention.

Films of the present invention preferably have thicknesses of from 50 to 200 µm for platen sealing applications and from 40 to 100 µm for four side sealing applications.

Packages in accordance with the present invention can take a variety of forms. For example, they can be in the form of two-dimensional packages, for example in the form of pouches, in which a piece of substantially flat film in accordance with the present invention is heat sealed by the surface consisting of the specified blend of polymers to a substantially flat sheet of a non-woven material, the packaged article or articles being sandwiched between the two sheets. However, a particularly preferred form of package in accordance with the present invention consists of a three-dimensional package consisting of a thermoformed sheet of film according to the present invention heat sealed by the surface consisting of the specified blend of polymers to a sheet of a non-woven material, the packaged article or articles being retained within the formed portion of the film.

The following Examples are given by way of illustration only.

EXAMPLE 1

Comparison

A four layer polymeric film was produced by coextruding through a slot die a base layer of low density polyethylene (density 0.918 g/cm$^3$, MFI 8 g/10 min according to ASTM D1238-95) with a layer of a low density polyethylene on one side and a layer of nylon 6 on the other, a tie layer of a maleic anhydride extended linear low density polyethylene being extruded between the base layer and the outer nylon layer. The coextrudate was cooled and then wound up.

The resulting film had a base layer of low density polyethylene 55 µm thick, an outer layer of the low density polyethylene 10 µm thick, and an outer layer of nylon 6 which was 30 µm thick, the tie layer being 5 µm thick. The total thickness of the film was 100 µm.

The film was then heat sealed by its surface formed from the low density polyethylene to a 60 g/m$^2$ medical grade paper sheet by applying heat through the paper using a pressure of 6 kPa and a heat sealing temperature in the range of from 120 to 170° C., the dwell times being either 1 or 2 seconds. Thereafter, the heat seals were peeled after first having adhered the paper to the wheel of the test equipment, peeling being effected by pulling the film of the invention radially of the wheel away from the paper.

The results of the peel tests are shown in Table 1.

TABLE 1

| Heat Seal Temp (° C.) | Dwell Time (sec) | Peel Strength (N/15 mm) | Peel Quality |
|---|---|---|---|
| 120 | 1 | 0.82 | No real seal |
| 120 | 2 | 1.16 | Slight fiber lifts |
| 130 | 1 | 0.77 | No real seal |
| 130 | 2 | 1.18 | Slight fiber lifts |
| 140 | 1 | 1.00 | Slight fiber lifts |
| 140 | 2 | 1.03 | Slight fiber lifts |
| 150 | 1 | 1.18 | Slight fiber lifts |
| 150 | 2 | 1.13 | Slight fiber lifts |
| 160 | 1 | 1.04 | Slight fiber lifts |
| 160 | 2 | 1.01 | Slight fiber lifts |

The film used in this Example did not produce satisfactory seals at 120° C., even with a dwell time of 2 seconds. Furthermore, even at higher heat sealing temperatures the seals produced were relatively weak. Fiber lifts indicate that some of the fibers in the paper stood slightly proud of the paper surface after peeling.

EXAMPLE 2

Comparison

A four layer film was produced substantially according to the method described in Example 1, except that the low density polyethylene was replaced by linear low density polyethylene.

This film was heat sealed to samples of paper used in Example 1, and the results of the peel tests carried out substantially as described in Example 1 are shown in Table 2.

TABLE 2

| Heat Seal Temp (° C.) | Dwell Time (sec) | Peel Strength (N/15 mm) | Peel Quality |
|---|---|---|---|
| 120 | 1 | 0.02 | No real seal |
| 120 | 2 | 0.25 | No real seal |
| 130 | 1 | 0.77 | No real seal |
| 130 | 2 | 1.53 | Fiber lifts |
| 140 | 1 | 1.09 | Slight fiber lifts |
| 140 | 2 | 1.74 | Fiber lifts/pickouts |
| 150 | 1 | 1.29 | Fiber lifts |
| 150 | 2 | 1.94 | Fiber lifts/pickouts |
| 160 | 1 | 1.29 | Fiber lifts |
| 160 | 2 | 2.05 | Fiber lifts/quite a few pickouts - 1 small clump |

As with the films of Example 1, no effective seals were produced at 120° C., even with a dwell time of 2 seconds. However, although sealing was achieved at higher temperatures, the useful temperature range was narrow, excessively strong seals being produced at temperatures above 140° C. and dwell times of 2 seconds. Pickouts represent single or clumps of fibers which have been removed from the surface of the paper and transferred to the polymeric film.

EXAMPLE 3

A four layer polymeric film was produced substantially as described in Example 1 except that the outer layer of low density polyethylene was replaced by a blend of 90% by weight of the low density polyethylene of the base layer with 10% by of poly-(α-methylstyrene).

The films were then heat sealed to paper as described in Example 1 and the seals produced were subjected to peel testing as described in Example 1. The results obtained are shown in Table 3.

TABLE 3

| Heat Seal Temp (° C.) | Dwell Time (sec) | Peel Strength (N/15 mm) | Peel Quality |
|---|---|---|---|
| 120 | 1 | 1.42 | Slight fiber lifts |
| 120 | 2 | 1.47 | Slight fiber lifts |
| 130 | 1 | 1.56 | Slight fiber lifts |
| 130 | 2 | 1.44 | Slight fiber lifts |
| 140 | 1 | 1.61 | Slight fiber lifts |
| 140 | 2 | 1.61 | Slight fiber lifts |
| 150 | 1 | 1.72 | Fiber lifts |
| 150 | 2 | 1.69 | Fiber lifts |
| 160 | 1 | 1.68 | Fiber lifts |
| 160 | 2 | 1.7 | Fiber lifts |

This film produced satisfactorily peelable heat seals over the temperature range of from 120 to 160° C., and with dwell times of either 1 or 2 seconds. In addition, even at the higher heat sealing temperatures and dwell times of 2 seconds, there d to be less fiber lift from the paper surface than with the seals produced in Example 2.

EXAMPLE 4

A four layer film was produced substantially as described in Example 1 except that the blend contained 95% by weight of the low density polyethylene and 5% by weight of the poly-(α-methylstyrene).

The films were then heat sealed to paper as described in Example 1 and the seals produced were subjected to peel testing as described in Example 1. The results obtained are shown in Table 4.

TABLE 4

| Heat Seal Temp (° C.) | Dwell Time (sec) | Peel Strength (N/15 mm) | Peel Quality |
|---|---|---|---|
| 120 | 1 | 0.95 | No real seal |
| 120 | 2 | 1.67 | Slight fiber lifts |
| 130 | 1 | 1.6 | Slight fiber lifts |
| 130 | 2 | 1.67 | Fiber lifts |
| 140 | 1 | 1.39 | Slight fiber lifts |
| 140 | 2 | 1.49 | Slight fiber lifts |
| 150 | 1 | 1.71 | Fiber lifts |
| 150 | 2 | 1.74 | Fiber lifts |
| 160 | 1 | 1.78 | Fiber lifts |
| 160 | 2 | 1.56 | Fiber lifts |

This film produced satisfactorily peelable heat seals over most of the temperature range shown, and with either 1 or 2 second dwell times. In addition, even at the higher heat sealing temperatures and dwell times of 2 seconds, there appeared to be less fiber lift from the paper surface than with the seals produced in Example 2.

What is claim is:

1. A polymeric film having at least one outer layer comprising a blend of low density polyethylene and poly-(α-methylstyrene).

2. A film according to claim 1, wherein the low density polyethylene has a density of from 0.915 to 0.930 g/cm$^3$.

3. A film according to claim 1, wherein the low density polyethylene has a melt flow index of from 2.0 to 40.0 g/10 min according to ASTM D1238-95.

4. A film according to claim 1, wherein the low density polyethylene has a density of about 0.918 g/cm$^3$ and a melt flow index of about 15 g/10 min according to ASTM D1238-95.

5. A film according to claim 1, wherein the blend contains not more than 20% by weight of the poly-(α-methylstyrene).

6. A film according to claim 5, wherein the blend contains not more than 15% by weight of the poly-(α-methylstyrene).

7. A film according to claim 6, wherein the blend contains from 2 to 12% by weight of a poly-(α-methylstyrene).

8. A film according to claim 1, wherein the poly-(α-methylstyrene) has a mean molecular weight $M_w$ from 800 to 2000.

9. A film according to claim 1, comprising two or more polymeric layers, at least one of the outer layers comprising said blend of low density polyethylene and poly-(α-methylstyrene.

10. A film according to claim 9, wherein the outer layer comprising said blend is at least 5 μm thick.

11. A film according to claim 10, wherein the outer layer comprising said blend is from 3 to 12 μm thick.

12. A film according to claim 9, having one outer layer of said blend and another outer layer comprising a nylon.

13. A film according to claim 9, including a base layer.

14. A film according to claim 13, wherein the base layer comprises a low density polyethylene.

15. A film according to claim 1, including a slip, antistatic or antiblock agent.

16. A package comprising a film according to claim 1 heat sealed to a non-woven web.

17. A package according to claim 16, wherein the non-woven web has been formed from cellulose or polyalkylene fibers.

18. A package according to claim 17, wherein the non-woven web comprises paper.

* * * * *